Sept. 30, 1969 G. R. HEFFNER 3,470,058
FOAMED PLASTIC STRUCTURES
Filed June 1, 1964 3 Sheets-Sheet 1
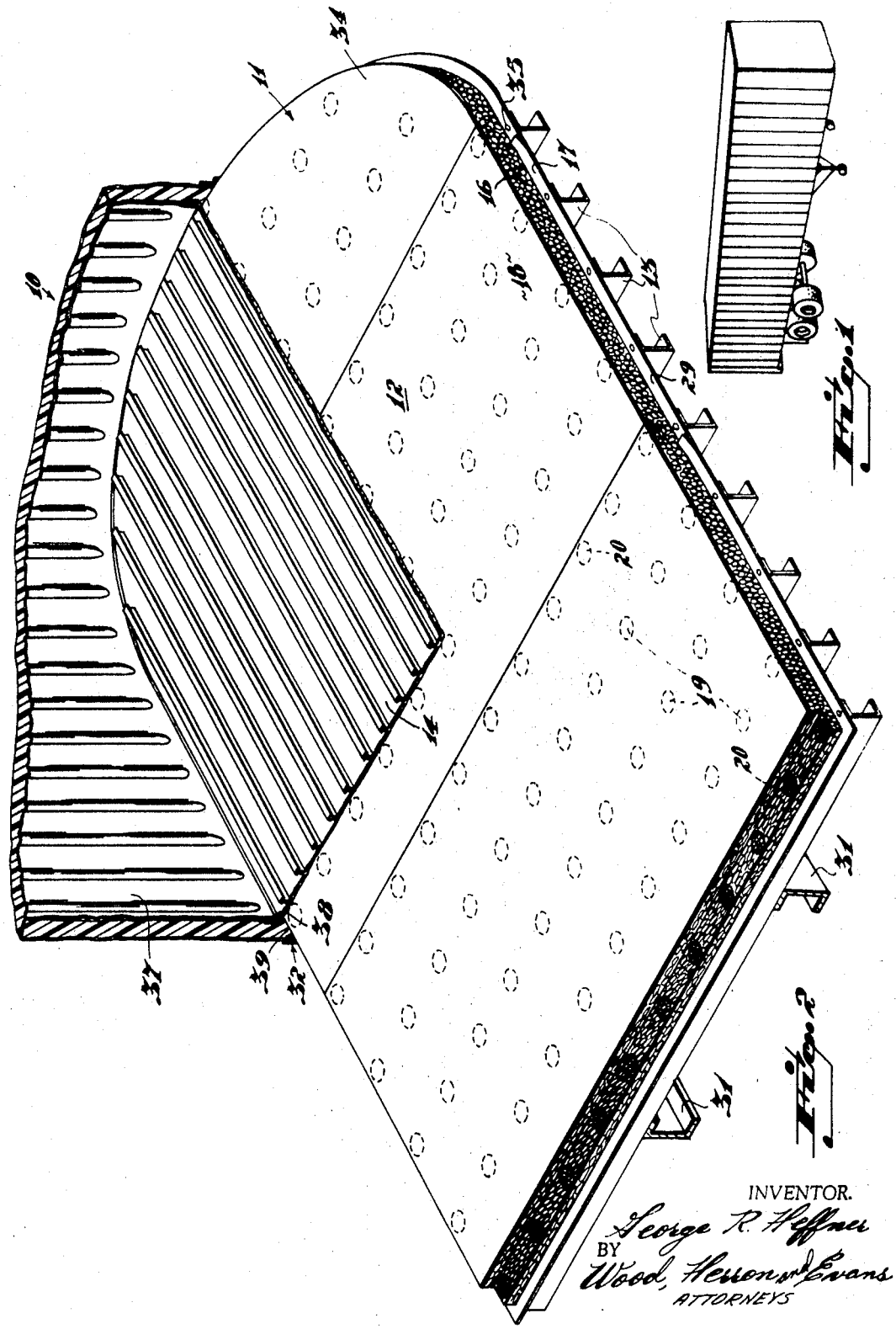
INVENTOR.
George R. Heffner
BY
Wood, Herron & Evans
ATTORNEYS Sept. 30, 1969   G. R. HEFFNER   3,470,058
FOAMED PLASTIC STRUCTURES
Filed June 1, 1964   3 Sheets-Sheet 2

INVENTOR.
George R. Heffner
BY
Wood, Herron & Evans
ATTORNEYS

INVENTOR.
George R. Heffner
BY
Wood, Herron & Evans
ATTORNEYS

United States Patent Office 3,470,058
Patented Sept. 30, 1969

3,470,058
FOAMED PLASTIC STRUCTURES
George R. Heffner, Cincinnati, Ohio, assignor to Pullman Incorporated, Chicago, Ill., a corporation of Delaware
Filed June 1, 1964, Ser. No. 371,426
Int. Cl. B32b 3/12, 5/18, 3/22
U.S. Cl. 161—69                                      6 Claims

ABSTRACT OF THE DISCLOSURE

A panel adapted to receive transverse compressive stress comprising, two spaced parallel sheets, a plurality of spacers between said sheets each constituted by a tubular skin surrounding expanded plastic foam having cells elongated in a direction parallel to said skin and perpendicular to said sheets, and plastic foam expanded in the remaining volume between said sheets.

---

Figures 3, 4, 5:
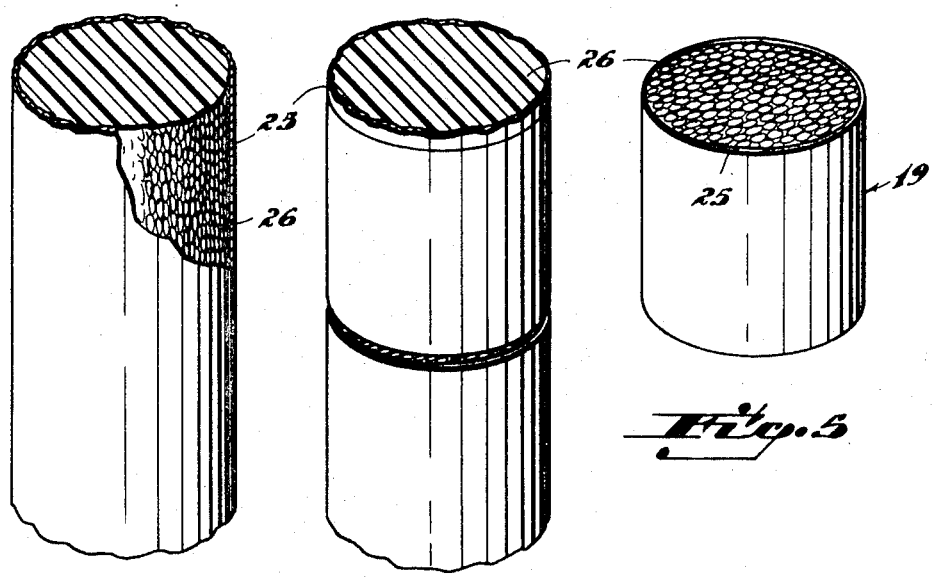

This invention relates to structural elements formed principally of expanded plastic foam and more particularly the invention is directed to the formation of an insulate floor panel for use in the manufacture of refrigerated cargo bodies. It will be observed in the following description that the invention has application much wider than the manufacture of floors for refrigerated cargo bodies but its genesis was in the solution to problems occurring in such cargo bodies and since its advantages will be readily demonstrated in that context, the invention will be described in relation to refrigerated cargo bodies.

In the manufacture of refrigerated cargo bodies, the floor structure has been constituted in part by spaced parallel sheets of plywood, the sheets being spaced apart by wooden cross bolsters extending transversely to the length of the cargo body on twelve inch centers. The cross bolsters space the sheets apart a distance of about four inches and are adapted to withstand the rather considerable compression forces of a fork lift truck commonly used during the loading and unloading of cargo. The space between the sheets has been filled with polyurethane foam to impart the needed insulative quality to the floor. The upper surface of the floor has been covered by a metallic floor structure which transmits the load to the insulative sandwich and additionally is preferably designed to minimize, insofar as possible, the seepage of liquids into the sandwich structure below.

It has been an objective of the present invention to substitute for the wooden cross bolsters employed in the floor a structure which is substantially entirely a plastic foam, preferably polyurethane. There is much to be gained from such a substitution. The insulative qualities of wood are markedly inferior to those of polyurethane foam. In the structure described, the wood covers approximately twelve percent of the area through which heat passes in the panel. If the wood could be replaced, by a material such as foam having greater insulative quality, the insulative quality of the complete floor could be increased by ten percent.

Still further, wood is heavy, having a weight ten times that of the plastic foam. It should be understood that for every pound of structural weight which can be eliminated without sacrifice to the strength of the unit, a pound of pay-load can be carried by the unit.

It has been impossible within sound economic practice, to prevent the introduction of some liquid into the sandwich panel. The cargoes, particularly the meats, in the cargo bodies cause another part of the problem. The meats drip blood onto the floor. Because of the temperature differential between the inside and outside of the cargo body, a considerable amount of moisture condenses on the metallic floor structure. The moisture combined with the blood causes a very considerable accumulation of liquid which sloshes about and seeps its way through the joints in the metallic floor covering and through the joints between the panel sheets. This bloody liquid causes the wood, usually fir, in the cross bolster to rot.

In general then, about the only thing that can be said for wood as a struitural element used to withstand the compressive stress of the floor panel sandwich structure is that it is inexpensive. It is, therefore, desirable to replace as much wood as possible in the panel.

An objective of the present invention has been to provide a structural element formed principally of plastic foam which can be substituted for the wooden cross bolsters to provide the support for the compressive loading on the floor panel of the refrigerated cargo body.

The structural element of the invention is formed by first forming polyurethane vertically in an elongated tube and after it has set, cutting the tube into short structural elements. The length of the tube is not critical to the formation of the elements for as long as the tube is filled to about one-thirtieth of its height with the liquid polyurethane, that polyurethane will expand to fill the tube.

The ability of the foam in the tube, before it is cut, to resist compressive stress in a direction transverse to its rise axis (vertical direction of expansion) may vary as much as five to one along the length of the tube. Near the top of the tube where the final stages of expansion has taken place and the cells are quite long, the compressive strength transverse to the rise axis is very low. The strength of the foam parallel to the rise axis, however is great, the elongating of the cells contributing to its strength. Therefore, at the top end of the tube in which the foam has been expanded the strength parallel to the rise axis is as much as four times as great as the compressive strength perpendicular to the rise axis.

While there is some variation in the strength parallel to the rise axis along the length of the tube, for all practical purposes the strength is substantially uniform. At the lower portions of the tube, the elongation of the cells is not so marked and the strength attributable to the elongation of the cells is reduced, but compensating for it is the greater density of the cells. Thus at the bottom of the tube where there is practically no elongation of the cell structure, the foam is quite dense and has substantially the same resistance to compressive strength in a direction parallel to the rise axis as has the structure at the upper end of the tube.

The disc elements are constituted by a tubular skin and polyurethane foam expanded in the skin. The skin alone, of course, has minimal compressive strength. The foam itself has minimal compressive strength, the strength being slightly greater than 40 p.s.i. parallel to the rise axis. When the foam and skin are combined in the manner described above, the compressive strength is dramatically increased to approximately 500 p.s.i. A plurality of these elements are spaced substantially uniformly throughout the space between two panel sheets and the remaining space between sheets may be filled by any insulative material including a plastic foam to form a panel element.

Another objective of the invention has been to provide a new insulated panel element having many applications including that of a floor structure for refrigerated cargo bodies.

It has been another objective of the invention to provide an edge structure for panels which is adapted for interconnecting similarly formed panels to provide an inter-locking joint structure.

Figure 6:
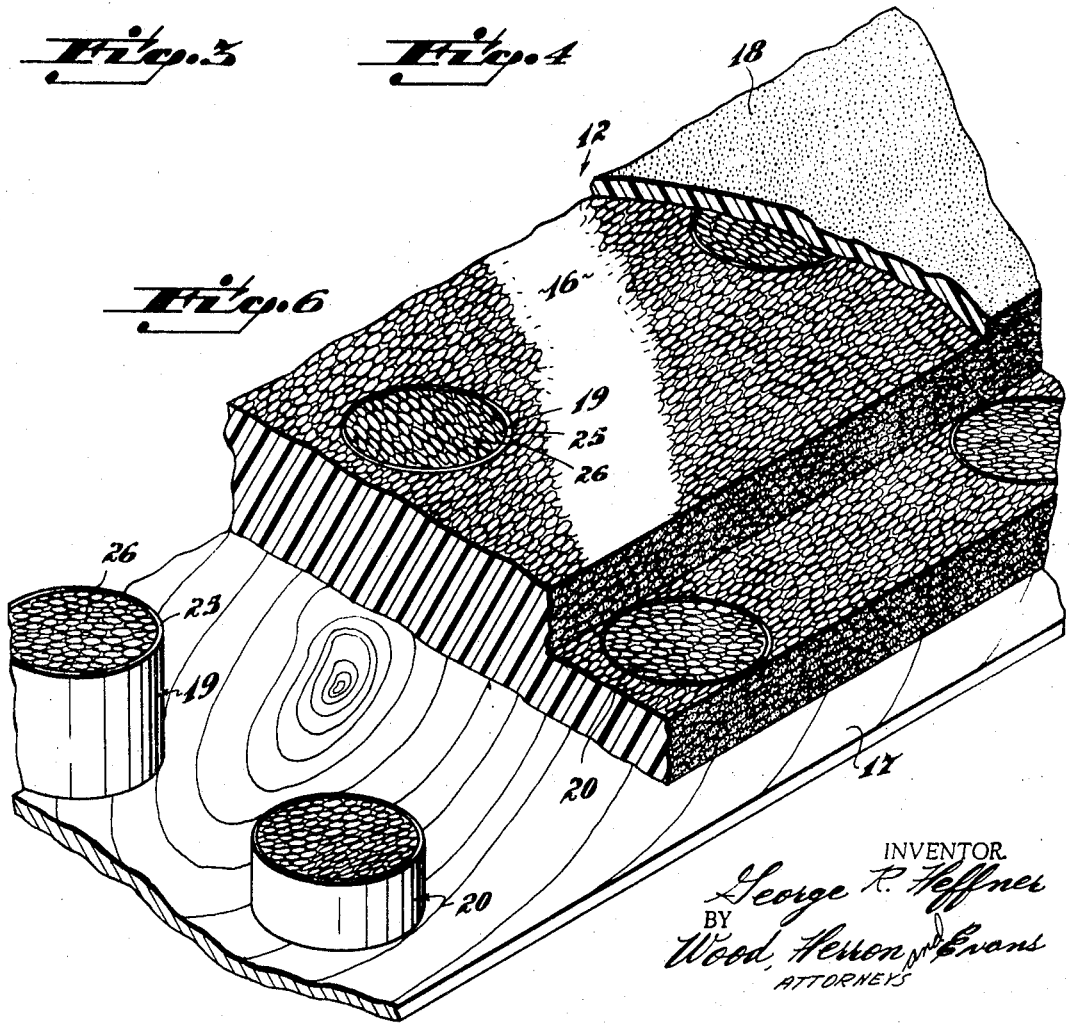
Figure 8:
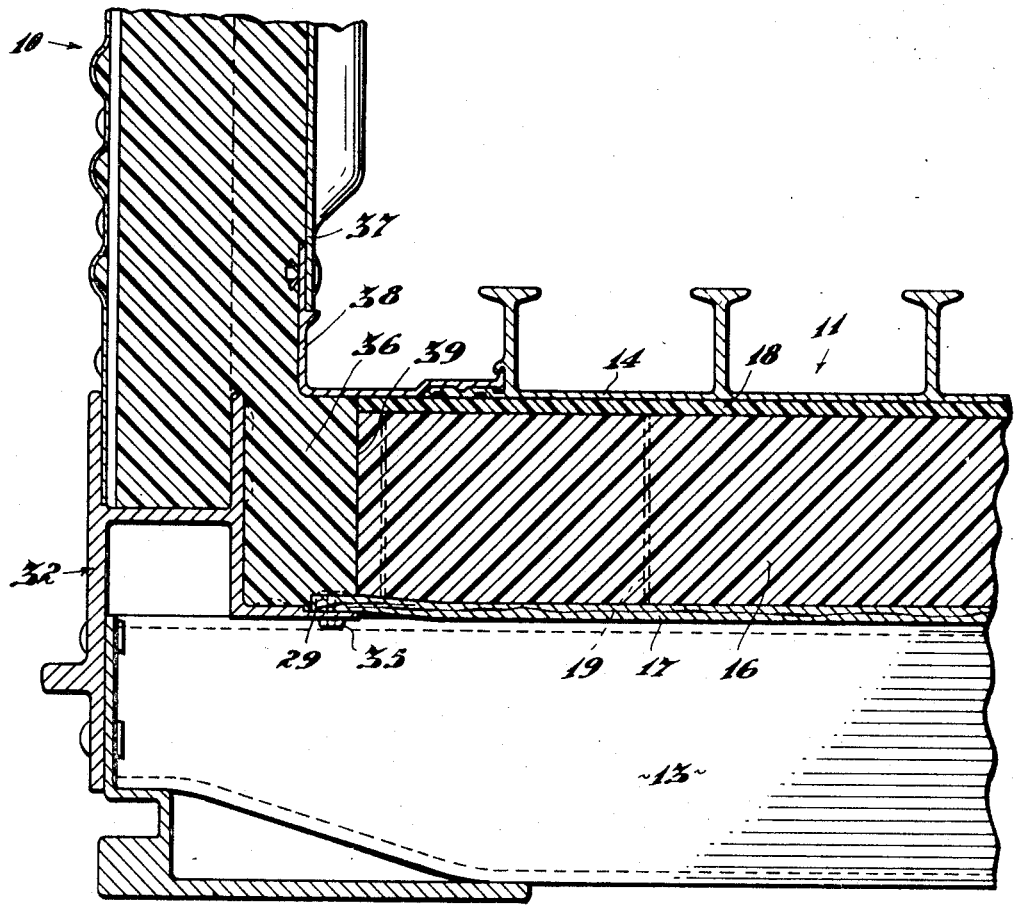
Figure 7:
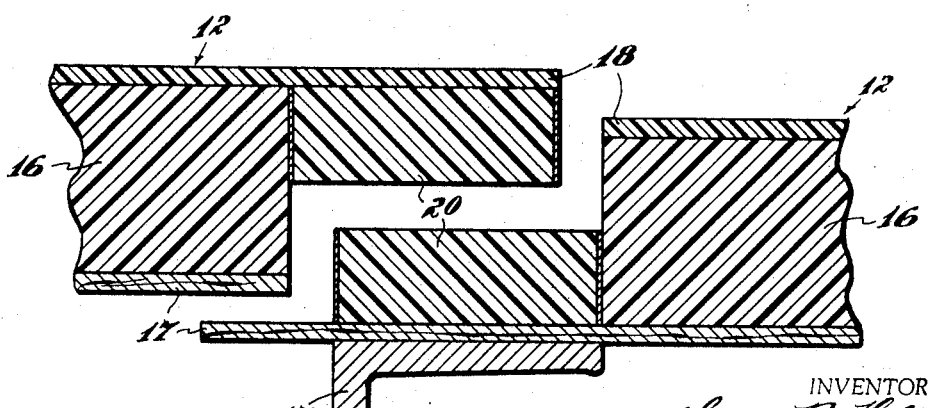

These and other objectives of the invention will become more readily apparent from the following detailed description taken in conjunction with the accompanying drawings in which:

FIG. 1 is a perspective view of a semi-trailer having a cargo body in which the present invention is to be used, FIG. 2 is a fragmentary view illustrating the cargo body floor structure using the invention, FIGS. 3, 4, and 5 are perspective views illustrating the formation of the compression element of the invention, FIG. 6 is a fragmentary perspective view showing the panel structure, FIG. 7 is a fragmentary cross sectional view of a joint formed between panel members, and FIG. 8 is a fragmentary cross sectional view of the corner structure of a cargo body utilizing the invention.

In its general organization and construction, the cargo body illustrated in FIG. 1 is well known. The known details of construction will not be described specifically herein but rather attention will be particularly directed to the manner in which the present invention is employed in manufacture of such a cargo body.

Referring to FIG. 2, the cargo body is shown as having insulated side walls 10 and a floor 11 formed of insulative panels 12. The panels are mounted on steel cross bolsters 13 and the upper surface of the panels support a metallic floor 14.

The floor panels are formed as a sandwich of polyurethane foam 16 disposed between a bottom sheet 17 and a top sheet 18. The sheets are maintained in their spaced parallel relation principally by discs 19 and half discs 20 which are the essential structural elements of the present invention.

The structural elements 19 and 20 which must withstand the compression stress applied to the floor of the cargo body are formed as illustrated in FIGS. 3, 4 and 5. A hollow tube 25 which is long in comparison to its diameter is filled with an expanded polyurethane foam 26. By way of example, a kraft paper or plastic tube which is approximately four inches in diameter and which is four feet long has about one-thirtieth of its length—about an inch and a half—filled with liquid polyurethane. The foaming material expands and rises as it expands and forms elongated cells which extend in a direction parallel to the geometrical elements forming the tubular walls. This direction of expansion and cell formation is called the foam rise axis.

The foam which is expanded in this manner exhibits anisotrophy, that is, its strength properties vary with its diretcion of formation. Specifically, the compressive strength parallel to the foam rise axis is greater than its compressive strength perpendicularly to the rise axis. This difference can be as great as four to one in high vertical rise foams due to extreme cell elongation during the last stage of gel formation because of the viscous drag along the side of the cavity being filled.

Further, disposing the foam in a tubular sheath or skin, greatly increases the compressive strength. The material formed, as in FIG. 3, in approximately a four inch diameter tube will support approximately sixty-five hundred pounds in compression, indicating that it has compressive strength in a direction parallel to the rise axis of approximately 500 p.s.i.

Reference here is made specifically to polyurethane as the foaming plastic because it is presently the most commercially feasible substance, but should be understood that any "foam-in-place" plastic is within the scope of the present invention.

The tube is then sliced into discs illustrated in FIG. 4, each disc being four inches high. The precise height of the discs of course is not critical to the invention. The four inch height is selected for the particular trailer application wherein a block of compressive material is required. In the embodiment described herein, the discs are used as spacers for the two sheets used to form the panels of the cargo container floor.

Utilizing the discs formed as described above, insulative panels are manufactured as illustrated in FIGS. 2 and 6. A plurality of the discs are uniformly spaced apart and sandwiched between the sheets 17 and 18 which are approximately four feet by eight feet. Preferably, the discs are on twelve inch centers in the direction of the length of the cargo body as viewed in FIG. 2 and are nine inch centers in the direction transverse to the length of the cargo body. The discs may be tacked or otherwise secured between the sheets so as to maintain the preferred uniform spacing.

The material from which the sheets are formed is not critical to the formation of the panels. The discs must be sandwiched between some form of skin to form a cavity to receive the insulative material. I prefer to use one-fourth inch plywood as the skin because it is inexpensive and because it has a satisfactory resistance to moisture. For the purpose of illustration, however, I have shown plywood as the bottom sheet 17 and molded fibre glass as the top sheet 18, the fibre glass adhering to the polyurethane when it is foamed in place.

Two parallel long edges of each panel have half size discs 20 disposed thereon. As shown in FIG. 2, one set of half size discs is tacked to the sheet 17 and at the opposite edge the discs 20 are tacked to the sheet 18 so that when two panels are joined edge to edge, their edges may be brought together in overlapping relation with half discs in alignment to fabricate a whole disc support.

The sandwich of sheets and discs is stood on edge with forms being applied around the periphery to contain the foam and to form a rabbet configuration along the edges having the half discs. The forms are applied to leave a marginal strip 29 of plywood around three edges of sheet 17. This strip facilitates attachment of the panel to the trailer frame as described below. The sandwich is then filled in the usual manner with polyurethane foam. The resultant panel structure is substantially entirely foam except for the outer sheets and the thin tubes of paper or plastic which have been employed in the formation of the structural discs. The panel therefore has an improved insulative quality since the use of high heat conductivity spacers has been eliminated. Further, the panel is adapted to carry much greater compressive loads than a similarly formed panel which depends upon the strength of the foam alone. Further, the strength of the panel will not vary with the random orientation of cells which is normally found in the foam-in-place technique of panel formation.

In the manufacture of the cargo body, a frame is first formed having a plurality of cross bolsters 13 mounted on longitudinal beams 31, the cross bolsters being on twelve inch centers. A composite rub rail 32 have the H-shape illustrated in FIG. 8 is secured to the ends of the cross bolsters along the longitudinal edges of the cargo body and around the forward end of the cargo body in a known manner.

The panels, starting with the forwardmost panel 34, are laid on top of the cross bolster and are tacked to the edges of the cross bolster as by rivets 35. The panels are preferably laid on top of the cross bolsters with the compression discs 19 and 20 in vertical alignment with the cross bolsters 13 so that the compressive force imparted to the discs will be transmitted directly to the cross bolsters.

Succeeding panels are laid on the cross bolsters and tacked thereto with the rabbet joints formed in overlapping relation with the half disc 20 in vertical alignment. The edges of the panels at the side of the cargo body are spaced from the rub rail 32 leaving a pocket 36 extending around the side and front of the cargo container floor.

After the panels have been laid on the cross bolsters in the manner described, the metallic floor covering 14 may be applied. One such floor construction is shown in Patent No. 2,923,384.

Sheets adapted to form the side walls of the cargo container are mounted on vertical posts in a known manner. The inner of such vertical sheets indicated at 37 in FIG. 8 overlies the pocket 36. A L-shaped member 38 forms a joint between the metallic floor 14 and the vertical wall sheet 37. When the vertical sheets are in place, polyurethane is introduced between them and foamed in place, as for example as described in my copending application Ser. No. 251,969, filed Jan. 16, 1963, now U.S. Patent No. 3,229,441. The foaming polyurethane flows into intimate contact with the side edges of the panels to form a very tight joint 39.

The floor structure which results from the use of panels of the present invention has a satisfactory resistance to compressive stress, is lighter than previous structures through the elimination of wood cross bolsters or spacers, and has superior insulative qualities in that it is of a substantially uniform foamed polyurethane composition over its entire area.

What is claimed is:

1. A panel for receiving transverse compressive loading comprising:

two spaced generally parallel planar sheets, a plurality of upright spaced apart structural reinforcing spacers for said sheets each spacer having a tubular skin and foamable plastic of low thermoconductivity foamed in place in said tubular skin such that the direction of columnar cellular growth of the foamable plastic is generally parallel to the side of the skin upward to the direction of pouring, producing elongation of the cellular network in upward generally parallel orientation to define the rise axis of the foamable plastic, and said plastic foamed-in-place being in complementary reinforcing relation with and between said tubular skin with the rise axis of the foamable plastic generally perpendicular to planes passing through the cross-sectional areas of said tubular skin and generally parallel to a plane passing through height axis of said tubular skin, said spacers being disposed between said sheets, and spaced from one another, the depth of the skin and the rise axis of the plastic in the spacers being generally perpendicular to the sheets, and plastic foamed-in-place between said sheets and between said spacers whereby the spacers in upright position are adapted to withstand vertical compressive loading in the direction of the rise axis.

2. The invention according to claim 1, and said foamable plastic being of polyurethane.

3. The invention according to claim 1, and said tubular skin being generally circular in shape generally in the plane passing through the cross-section of the tubular skin and generally perpendicular to the rise axis of the foam plastic and the axis of the tubular skin.

4. A panel construction suitable for mounting on a plurality of longitudinally spaced transverse frame members comprising:

two spaced generally parallel planar sheets, a plurality of upright spaced apart structural reinforcing spacers for said sheets each spacer having a tubular skin and foamable plastic of low thermoconductivity foamed in place in said tubular skin such that the direction of columnar cellular growth of the foamable plastic is generally parallel to the side of the skin upward to the direction of pouring, producing elongation of the cellular network in upward generally parallel orientation to define the rise axis of the foamable plastic, and said plastic foamed-in-place being in complementary reinforcing relation with and between said tubular skin with the rise axis of the foamable plastic generally perpendicular to planes passing through the cross-sectional areas of said tubular skin and generally parallel to a plane passing through height axis of said tubular skin, said spacers being disposed between said sheets, and spaced from one another, the depth of the skin and the rise axis of the plastic in the spacers being generally perpendicular to the sheets, plastic foamed-in-place between said sheets and between said spacers whereby the spacers in upright position are adapted to withstand vertical compressive loading in the direction of the rise axis, and a respective spacer being adapted to be placed disposed over a complementary transverse frame member.

5. The invention according to claim 4, and said foamable plastic being of polyurethane.

6. The invention according to claim 4, and said tubular skin being generally circular in shape generally in the plane passing through the cross section of the tubular skin and generally perpendicular to the rise axis of the foam plastic and the axis of the tubular skin.

References Cited

UNITED STATES PATENTS

| | | | |
|---|---|---|---|
| 2,923,384 | 2/1960 | Black | 52—588 |
| 3,226,899 | 1/1966 | Blickle | 52—309 XR |
| 2,477,852 | 8/1949 | Bacon | 161—68 |
| 2,744,042 | 5/1956 | Pace | 156—79 XR |
| 2,910,730 | 11/1959 | Risch | 264—45 |
| 2,973,295 | 2/1961 | Rodgers | 161—121 |
| 3,003,810 | 10/1961 | Kloote et al. | 161—161 XR |
| 3,231,439 | 1/1966 | Voelker | 156—79 |

FOREIGN PATENTS 772,181  4/1957  Great Britain.

H. F. EPSTEIN, Primary Examiner

EARL M. BERGERT, Assistant Examiner

U.S. Cl. X.R.

52—309; 161—161; 264—45